Sept. 16, 1941.  W. L. KAUFFMAN, 2D  2,255,977
WRINGER AND THE LIKE
Original Filed Feb. 6, 1936
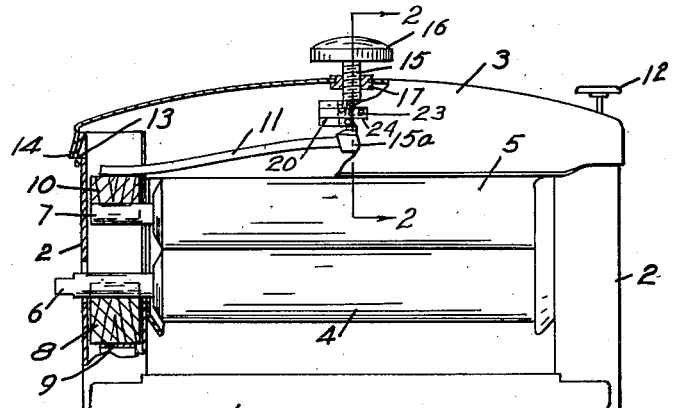
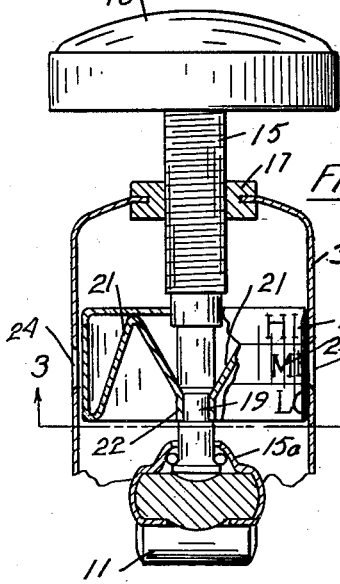
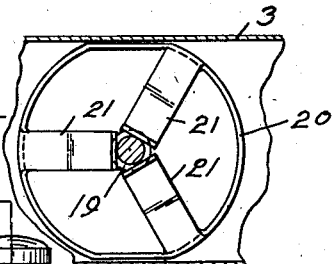
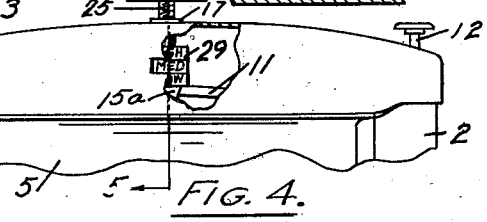
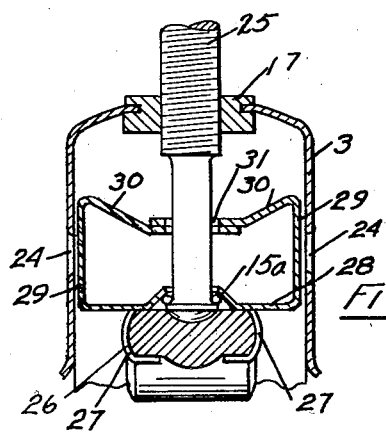
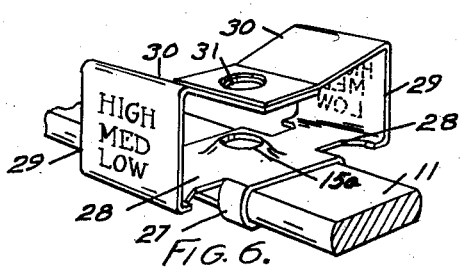
Walter L. Kauffman II
INVENTOR.
BY
ATTORNEYS.

Patented Sept. 16, 1941

2,255,977

UNITED STATES PATENT OFFICE 2,255,977

WRINGER AND THE LIKE

Walter L. Kauffman, II, Erie., Pa., assignor to Lovell Manufacturing Company, Erie, Pa., a corporation of Pennsylvania Original application February 6, 1936, Serial No. 62,605. Divided and this application June 9, 1939, Serial No. 278,299

1 Claim. (Cl. 68—262)

Wringers, as at present made, ordinarily provide a pair of wringer rolls which are subjected to yielding pressure through a spring. Means are usually provided for varying the pressure of the spring.

The present invention is designed to improve the pressure adjusting means by providing devices for indicating the pressure adjustment so that the operator without trial may provide the proper adjustment for the type of clothes which are being passed through the wringer. Other features and details of the invention will appear from the specification and claim.

Preferred embodiments of the invention are illustrated in the accompanying drawing as follows:

Fig. 1 shows a front elevation of a wringer partly in section.

Fig. 2 a section on the line 2—2 in Fig. 1.

Fig. 3 a section on the line 3—3 in Fig. 2.

Fig. 4 a front elevation of a modification partly in section.

Fig. 5 a section on the line 5—5 in Fig. 4.

Fig. 6 a perspective view showing an indicating device.

I marks a base of a wringer frame; 2—2 side stiles for the frame; 3 a movable top bar; 4 and 5 wringer rolls; 6 and 7 shafts for the wringer rolls; 8, bearings for the shaft 6, the bearings resting on shafts 9 in the stiles; 10, upper bearings for the shaft 7, the upper bearings being slidingly mounted in the stiles 2; 11 a pressure spring resting on the upper bearings. 12 illustrates an operating handle of a release device for one end of the top bar, the details of the release device not being shown; 13 a shoulder struck up in the opposite side stile, and 14 a shoulder formed in the top bar for locking the top bar on the stile; 15 an adjusting screw for adjusting the pressure on the spring; 16 a handle for the adjusting screw; 17 a nut fixed in the top bar; 15a a swivel connection between the screw 15 and the spring. The screw has the swivel connection 18 on the spring and an annular groove 19. An indicating plate 20 is mounted on the screw and has the inturned portions 21 which form a sleeve 22 journaled in the groove 19. The plate 20 has the index markings 23, "High," "Med." "Low" which show through an opening 24 at the front and rear of the top as the plate 20 follows the position of the spring, and consequently the pressure settings are indicated directly through the openings 24. The plate 20 has flats that engage the front and rear faces of the top bar and lock the plate against turning.

In the modification shown in Figs. 4 to 6 the pressure screw 25 has a handle 16 directly mounted on and fixed relatively to the screw. The swivel connection includes a clip 26 secured by flanges 27 which extend around the spring. The clip has crosswise extensions 28, the uprights 29, and the inturned portions 30 which overlap and which are provided with the perforations 31. The upright portions 29 have the index markings "High," "Med." and "Low" which are exposed through openings 24 in the front and rear of the top. This indicating device is, as will be seen, mounted directly on the spring and shows the initial deflection of the spring indicating the high, medium and low pressure adjustments of the spring.

This application is a division of application No. 62,605 filed February 6, 1936, now Patent No. 2,201,540, granted May 21, 1940.

What I claim as new is:

In a wringer having a frame comprising a base and side stiles; and rolls mounted in the frame; the combination therewith of a top bar, the top bar having separated front and rear walls and said walls having sight openings therein; means exerting equalizing yielding pressure from a central position on the top bar on the ends of the rolls comprising a screw mechanism at the center of the top bar centering the pressure for the means; and an index plate having clipped fingers securing the plate to the spring, and side extensions providing index insignia adapted to move with the spring and across the openings in the top bar.

WALTER L. KAUFFMAN, II.